United States Patent [19]
Tsuda

[11] 3,959,016
[45] May 25, 1976

[54] METHOD FOR MANUFACTURING LEAD GRID PLATES FOR BATTERIES

[75] Inventor: Naokatsu Tsuda, Tokyo, Japan

[73] Assignee: The Furukawa Electric Co., Ltd., Tokyo, Japan

[22] Filed: Dec. 24, 1974

[21] Appl. No.: 536,222

[30] Foreign Application Priority Data

| | | |
|---|---|---|
| Dec. 26, 1973 | Japan | 49-2182 |
| Dec. 29, 1973 | Japan | 49-4082 |
| Jan. 31, 1974 | Japan | 49-13132 |
| Jan. 31, 1974 | Japan | 49-13133 |
| Jan. 31, 1974 | Japan | 49-13134 |
| Nov. 1, 1974 | Japan | 49-126316 |

[52] U.S. Cl. .................................. 136/67
[51] Int. Cl.² .............................. H01M 4/82
[58] Field of Search ............... 136/36–67, 136/27; 148/11.5 R; 29/2

[56] References Cited
UNITED STATES PATENTS

| | | | |
|---|---|---|---|
| 2,499,566 | 3/1950 | Bouton et al. | 148/11.5 R |
| 3,269,863 | 8/1966 | Helms | 136/36 |
| 3,310,438 | 3/1967 | Huffman et al. | 136/36 |
| 3,458,355 | 7/1969 | Radtke | 136/38 |
| 3,536,531 | 10/1970 | Sekido et al. | 136/27 X |
| 3,607,411 | 9/1971 | Brownrigg | 136/37 |
| 3,621,543 | 11/1971 | Willmann et al. | 136/36 X |
| 3,621,701 | 11/1971 | Evans et al. | 136/36 X |
| 3,706,605 | 12/1972 | Newbury et al. | 148/11.5 R |

Primary Examiner—John H. Mack
Assistant Examiner—C. F. Lefevour
Attorney, Agent, or Firm—Wenderoth, Lind & Ponack

[57] ABSTRACT

A method for manufacturing a lead grid plate for batteries comprising the first process of preparing a rolled lead alloy plate measuring 0.5 to 1 mm in thickness; the second process of press punching the rolled lead alloy plate by means of a metal mold to obtain a lead grid plate, the width of the grid forming members of the plate measuring about the same as the thickness of the plate; and the third process of hardening said lead grid plate through a heat treatment with or without a prior shape correcting process carried out before the third process.

2 Claims, 21 Drawing Figures

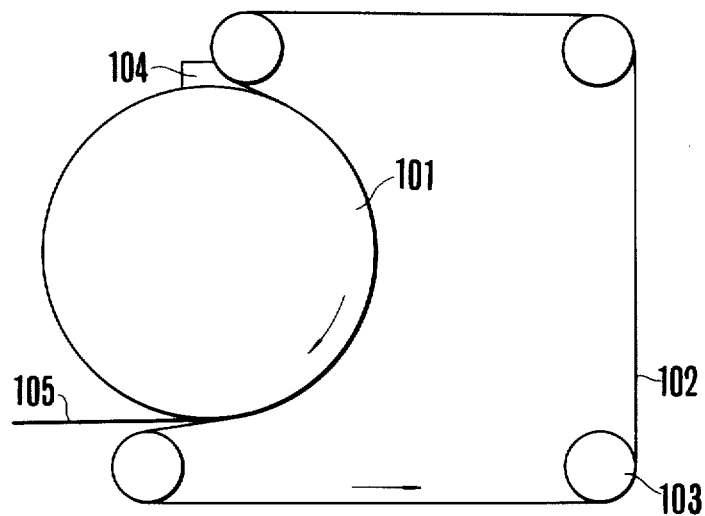
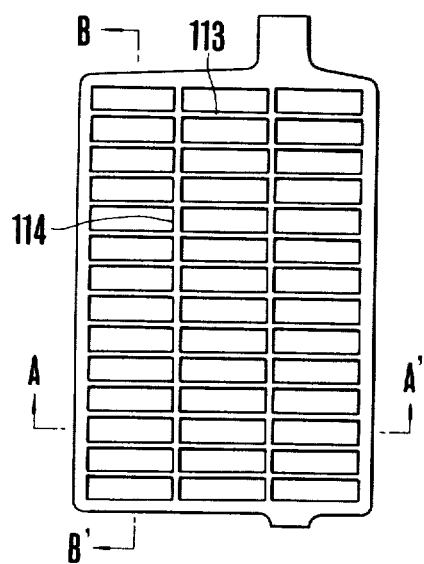

METHOD FOR MANUFACTURING LEAD GRID PLATES FOR BATTERIES

BRIEF SUMMARY OF THE INVENTION

This invention relates to a method for manufacturing lead grid plates usable for batteries and more particularly to a method for manufacturing such plates from rolled lead alloy plates through a press punching process. In this method, the hardening of the lead alloy is accomplished either by preparing the rolled lead alloy plate through a hot rolling process or by carrying out a heat treatment before or after the press punching process to increase the hardness of the lead grid plate for the purpose of attaining an increased strength to facilitate the battery assembling work, and at the same time, for making it possible to reduce the thickness of the lead grid plate, so that the weight of the battery can be eventually reduced and its output can be increased. Furthermore, a continuous arrangement of the rolling, press punching and heat treatment processes also permits the continuous and efficient mass production of such lead grid plates with high dimensional precision at a low cost.

BACKGROUND OF THE INVENTION

The conventional lead grid plates for battery are generally manufactured by means of metal molds. The thickness of such cast grid plates is more than 1.2 mm. Moreover the thickness of the transverse and vertical members inside the grid plate frame is more than 0.8 mm. It is impossible to make them thinner, because any attempt to make them thinner results in a product partly lacking their grid constituent members.

In other words, in the casting process, it is impossible to ensure that the molten lead alloy reaches every part of the metal mold even when the temperature of the mold is high. This results in the production of unusable lead grid plates.

Yet, requirement for lead grid plates that are thinner than 1.2 mm recently arised to make it possible to have more electrodes in one container for the purpose of increasing the capacity of battery and also reducing their weight.

In addition to above-stated shortcoming, the casting process is not suitable for continuous mass production in terms of cost and efficiency. It is another shortcoming of the casting process that the dimensional precision of the cast product is inferior and this presents a problem in the automation of battery assembling processes.

In order to eliminate such shortcomings of the casting process, it is conceivable to manufacture lead grid plate through a press punching process. However, although the press punching process permits making the width of the grid forming member about 1 mm when the plate thickness is more than 1.2 mm, it is extremely difficult to make the width less than 1 mm when the plate thickness is less than 1 mm. However, with the width of the grid forming members wider than 1 mm, the amount of the active material that can be retained by the lead grid decreases. Then, with the retaining amount decreased, there is no sense in exerting the effort to make the lead grid plate thinner.

Generally, is punching a metal plate of iron, aluminum, etc. into a grid shape by means of a press, it is impossible to make the width of the grid forming members about the same as the thickness of the plate. Besides the lead alloy which is employed in manufacturing the lead grid plates for batteries is softer than iron, aluminum and other metals. This makes the press punching more difficult. The deformation and breakage of the structural members of the grid tend to take place in the punching process. It is thus difficult to obtain usable lead grid plates. This tendency is more stronger with a thin plate measuring less than 1 mm thickness and with narrow grid forming members measuring less than 1 mm width.

This invention solves these problems. In accordance with the invented method, the thickness of the lead grid plate can be decreased to about 0.6 mm and the width of the grid forming members also can be reduced to about the same as the thickness. This is impossible by the conventional casting method. Besides, the invented method makes possible continuous production processes including preparation of lead grid plates from strips of a lead alloy obtained by a continuous casting process, filling the grid windows with an active material paste and obtaining dried, filled plates.

DETAILED DESCRIPTION OF THE INVENTION

The first object of this invention is to provide a thin lead grid plate by carrying out a heat treatment process for hardening the lead alloy at a suitable stage in the production comprising the preparation of a rolled lead alloy plate, press punching and preparation of the lead grid plate so that the strength of the product can be increased by such hardening. Such hardening heat treatment serves to eliminate the difficulty of work caused by the deformation that would otherwise takes place when an active material is applied to the lead grid plate.

Generally, in processing lead alloy, an ingot of the lead alloy softens when it is subjected to a cold rolling process and the hardness of the ingot which is about 25 by Vickers hardness normally comes to decrease to 7 or thereabout. This presents a very soft state, which makes the assembling work on battery hardly possible and this is the reason for carrying out the hardening heat treatment.

With such treatment carried out in accordance with the invented method, the conventionally employed materials containing 4.2% Sb and even such materials that contain 2% Sb can be made into grid plates of sufficient hardness.

The second object of this invention is to provide lead grid plates of improved hardness and accordingly of improved mechanical properties, which are attained by first subjecting a lead alloy plate softened by cold rolling to a press punching process to obtain a lead grid plate and then by carrying out a heat treatment.

This object is attained through the combination and sequence comprising the first process for preparing a rolled lead alloy plate, the second process for press punching the lead alloy plate by means of a metal mold to make it into a lead grid plate with the width of the grid forming members measuring about the same as the thickness of the plate and the third process for hardening the lead grid plate by heat treatment after or without shaping.

For this method, a base plate of the same thickness as the desired thickness of the lead grid, say 0.5 to 1 mm, is obtained from an ingot through rolling. A lead-antimony alloy is generally employed for the manufacture of batteries. The hardness of the alloy in the state of an ingot prepared by casting decreases as the degree of rolling increases.

Accordingly, the lead alloy base plate is softened by rolling in the first process. This facilitates punching with a press in the second process, wherein a desired form of the lead grid plate is obtained by carrying out press punching with a metal mold.

The punching process is accomplished using a punching mold which comprises a male mold and a female mold. The male mold has protrusions in positions corresponding to the voids of the lead grid. In the female mold, only the parts corresponding to the grid members serves for the purpose of punching. For a narrow width of the grid forming members in the range of 0.5 to 1 mm as in the case of this invention, the strength of the female mold tends to be insufficient. When the lead grid base plate to be press-punched is hard, such hardness requires a greater punching force, which tends to cause the deformation of the female mold or the breakage of the parts corresponding to the grid forming members of the grid plate.

However, since the lead grid base plate has been softened by the rolling in the first process, the use of a small punching force suffices. This in turn also ensures a good grid shape of the lead grid plate besides reducing the possibility of deforming the metal mold for a longer service life and easier maintenance of the mold.

Meanwhile, the lead grid plate obtained through the second process is too soft and does not have sufficient strength. The third process is therefore carried out to increase the hardness of the base plate which has been softened by the rolling process for the purpose of ensuring good mechanical property of the product.

It is the third object of this invention to provide a simplified punching process for obtaining a lead grid plate, wherein a rolled lend alloy plate which is hardened by heat treatment carried out during and/or following the rolling process is subjected to a press punching process in such a manner as not only to ensure ready separation of the punched lead grid plate from the bottom of the mold but also to permit obtaining a punched plate without any additional process.

This object is attained by the combination and sequence of the first process of preparing a rolled lead alloy plate, the second process of hardening by heat treatment which is carried out either during or following the first process and the third process for press punching the hardened, rolled lead alloy plate with a metal mold to obtain a lead grid plate which has grid forming members of width measuring about the same as the thickness of the plate.

Since the press punching process is carried out on a hardened rolled plate with a metal mold, a lead grid plate wherein the width of the grid members measures about the same as the plate thickness can be obtained with a high degree of precision. In addition to such an advantage, the lead grid plate is free from deformation by punching so that a product of good flatness can be obtained requiring no additional process for finish shaping.

Furthermore, since the lead grid plate is obtained by punching a hardened rolled plate, the product thus obtained retains the same hardness of the hardened rolled plate. This ensures good mechanical properties of the product.

It is the fourth object of this invention to provide a process for facilitating the preparation of lead grid plates wherein press punching by means of metal molds is carried out stepwise to facilitate the preparation of lead grid plates.

With the multistep punching process employed, the number of the critically narrow parts of the punching metal mold measuring, say, 0.5 – 1.0 mm can be minimized so that its service life can be increased.

As mentioned in the foregoing, the hardness of the rolled lead alloy plate decreases as the degree of rolling increases. While such decrease in the hardness permits the use of a smaller punching force for press punching the rolled plate, the extreme thinness of the plate tends to results in the deformation of the lead grid plate, particularly in the deformation of the grid members. The desired form of the plate is sometimes hardly retainable.

To solve this problem, the shape of the lead grid plate is corrected after press punching and before the hardening process is carried out by heat treatment. Though this enables the deformation due to press punching to be corrected to a certain degree, such deformation is often beyond correction and the desired lead grid plate is hardly obtainable.

Such a problem can be solved by the above stated multistep punching process, which is carried out by punching the rolled lead alloy plate stepwise, instead of punching in one step, in a suitable way such as punching every alternate file or row or in a zigzag manner while avoiding the deformation of the grid plate. This method minimizes the deformation of the lead grid plate. And, even if there is left some deformation, such deformation can be eliminated by a flattening process carried out before the hardening heat treatment, so that a lead grid plate of high quality can be otained.

For the above stated multistep press punching process, a suitable method of uniformely carrying out the process without causing local deformation of the lead grid plate is selected. The preferred modes of carrying out the process include, for example, the above-stated alternate punching and zigzag punching which permit easy correction of deformation in the next process as necessary.

The press punching in each step may be accompanied by correction of deformation in such a way as to alternately performing the punching and the shape correction.

In the multistep press punching process, the shape of the lead grid plate is corrected before the base plate which has been softened by rolling is hardened by a heat treatment process for improved mechanical properties. However, such hardening heat treatment may be carried out before the multistep press punching process.

It is the fifth object of this invention to provide a process for attaining an improved active material retainability of the lead grid plate wherein the deformation of the lead grid plate resulting from the above-stated multistep press punching process is retained and fixed as it is.

Since the hardness of the rolled lead alloy plate decreases as the degree of rolling applied to it increases, the press punching of the plate with a metal mold can be accomplished with a small punching force as already mentioned in the foregoing. This, on the other hand, requires an additional work for correcting the deformation of the lead grid plate and particularly that of its grid forming members as such deformation tends to take place due to the extreme thinness of the rolled plate, such as 0.5 to 1 mm.

In attaining the fifth object of this invention, such deformation is utilized with advantage, and the active material retaining ability of the lead grid plate is enhanced by fixing such deformation as it is by carrying out the hardening heat treatment without correcting the deformation of the grid member of the grid plate.

The reason for the stepwise press punching lies in the fact that one-step press punching causes the excessive deformation of the grid members. This would result in the degraded quality of the lead grid plate product and, to avoid it, an additional process would be required before the hardening heat treatment. Such an addition process complicates the production work and is not desirable.

The modes of carrying out the multistep press punching process include alternate row punching, alternate line punching and zigzag punching. In carrying out the press punching process in such modes, it is desirable to avoid the excessive deformation of the grid forming members and to ensure the uniform distribution of deformation to a moderate degree.

The deformation of the grid constituent members resulted from the multistep press punching can be left intact and can be fixed as it is by the hardening heat treatment. However, if so desired, the deformation of the grid constituent members may be modified by suitable means before the heat treatment.

The sixth object of this invention is to provide a process wherein the deformation of the grid members caused by the press punching of a rolled lead alloy plate softened by rolling is modified to a suitable sectional shape before carrying out a hardening process.

Generally, in the lead grid plate obtained by applying a press punching process to a rolled lead alloy plate, the grid forming members of it present an angular sectional shape. In the case of an extremely thin plate, such as 0.5 to 1 mm, such a shape presents a problem of insufficient active matter retainability.

This problem is solved by this invention. The angular sectional shape of the grid constituent members of the lead grid plate press punched, by means of a metal mold, from a rolled lead alloy plate is modified by pressing it into a circular or elliptical shape to increase its active material retainability to a great degree.

By this process, when the angular sectional shape of the lead alloy plate obtained by press-punching a rolled lead alloy plate is modified into a circular or elliptical shape, the above-stated irregular deformation is concurrently corrected to such an extent that another process for correcting or modifying the deformation of the grid constituent members can be despensed with.

The above-stated modification of the shape of the grid forming members can be accomplished by the ordinary pressing process.

The modification of the sectional shape of the grid forming members to a circular or elliptical shape by pressing is accomplished before the hardening heat treatment to obtain a desired product.

In the foregoing, the thickness of the outer frame of the lead grid plate is described to range from 0.5 to 1 mm. However, the press punching process of this invention is applicable to the manufacture of other lead grid plates measuring, for example, 1.5 mm in plate thickness and 0.8 mm in the width of the grid forming members. In such a case, although the thickness of the outer frame is large, the width of the grid forming members is sufficiently narrow to ensure an increased active material retaining ability. Therefore, this invention is applicable also to lead grid plates having thick outer frames as described below:

The seventh object of this invention is to provide a method for manufacturing lead grid plates wherein the thickness of the outer frame of the lead grid plate is arranged to be in the range from 0.8 to 1.5 mm which is thicker than the lead grid plate obtained by the press punching process described in the foregoing; while the thickness of the grid constituent members inside the frame is arranged to be 0.6 to 0.8 mm which is slightly thinner than the grid plate obtained by the above stated press punching. With the thickness of the inner grid forming members thus being arranged to be less than the outer frame, the manufacture of thin lead grid plates can be more easily and steadily carried out; and yet the active matter retainability can be also enhanced thereby.

In the above stated lead grid plate, the inner frame members are arranged to be thinner than the outer frame and to make them stand back from the outer frame stepwise in such a manner as to make it active matter retainability much greater than that of the lead grid plate of even thickness. The active matter retainability of the lead grid plate can be enhanced to a great extent by such arrangement without any additional process for roughening its surface.

Furthermore, since the thickness of the outer frame is increased to be between 0.8 and 1.5 mm, the strength of the lead grid plate of the above stated type is sufficiently great to ensure that it can be manufactured and handled without fear of deforming it.

Since a relatively thick rolled lead alloy plate measuring between 1.2 and 1.5 mm in thickness is employed as a press punching material in the preparation of the above stated lead grid plate, such a material is obtainable without difficulty and at a low cost. The formation of the inner grid forming members by press punching void parts in the relatively thick rolled lead alloy plate permits carrying out such punching in one step without fear of any deformation of the lead grid plate. This also greatly facilitates the manufacture of lead grid plates.

The above-stated lead grid plate is readily obtainable by preparing a rolled lead alloy plate of thickness between 0.8 and 1.5 mm; by punching void parts in the plate into a shape of grid; and then by applying a press or the like to the grid forming members in the direction of their thickness to make them thin.

In the foregoing, the thickness of the outer frame is set between 0.8 and 1.5 mm because with the thickness less than 0.8 mm, the lead grid plate is not strong enough to with-stand the press punching and handling, while, with the thickness exceeding 1.5 mm, the lead grid plate becomes excessively thick. On the other hand, the vertical and transverse grid members inside the frame is set between 0.6 and 0.8 mm because the minimum value of 0.6 mm represents a threashold value in relation to the problem of galvanic corrosion that takes place in service, while, with the thickness exceeding 0.8 mm, the difference from the thickness of the outer frame becomes insufficient in terms of the quantity of the active material that can be applied and the capability of retaining it.

For the actual manufacture of the lead grid plate, there are no particular limitations as to the width of the outer frame and that of the inner frame members. A suitable width of the outer frame can be determined in relation to its thickness while that of the inner frame members can be determined in relation to its final thickness.

It is the eighth object of this invention to provide a method for continuously manufacturing lead grid plates with high efficiency and at a low cost, the thickness of their outer frames ranging from 0.8 to 1.5 mm with the thickness of their vertical group and transverse group of grid forming members or that of at least one of the two groups being arranged to be thinner than the outer frame and to be within the range from 0.6 to 0.8 mm.

The present invention may be practiced in two different modes, i.e. Mode A and Mode B as described below:

MODE A

A rolled lead alloy plate measuring between 0.8 and 1.5 mm and hardened by heat treatment is press punched with a metal mold to form grid windows. Then, at least one of the vertical group or transverse group of members forming the punched grid windows are subjected to a shape modification process in the direction of thickness of these inner grid members to make their thickness between 0.6 and 0.8 mm. After this, the outer frame of the grid is punched out of the lead alloy plate to obtain a lead grid plate usable for batteries. The above-stated hardening by heat treatment may be accomplished by the heat treatment that is consequently effected immediately after hot rolling or may be accomplished by a separately arranged heat treatment after cold rolling.

As for the press punching of the grid windows with a metal mold, such punching can be accomplished in one step as the rolled lead alloy plate has already been hardened. It is preferable, however, to accomplish such punching by a multistep process such as zigzag punching in two steps.

The shape modifying process to be applied to the inner grid forming members must be applied to at least one of the vertical or transverse groups of the grid members in the direction of their thickness. In cases where such shape modification is applied to one group of the grid members, the other group of the grid members are preferably subjected to a process for modifying their sectional shape into a shape different from that of the other group.

As described in the foregoing, the rolled lead alloy plate of thickness between 0.8 and 1.5 mm is subjected to a hardening heat treatment because the lead alloy to be employed in rolling its ingot into a rolled plate of such thickness is a lead-antimony alloy in general. The hardness of such alloy in the stage of the ingot decreases as the degree of rolling increases. The decreased hardness of the rolled plate then makes the above stated grid window punching process difficult. The heat treatment is carried out to solve this problem.

This hardening heat treatment serves to facilitate the removal of punched chips from the mold and makes it possible to easily carry out the punching without any additional process. With such heat treatment accomplished, it is also possible to easily punch inner grid members of width measuring about the same as the plate. By this, the grid members are free from deformation otherwise caused by press punching, so that inner grid members of good flatness can be obtained.

When a relatively thick rolled lead alloy plate measuring 0.8 to 1.5 mm is employed as material for punching with the punching first carried out to obtain inner grid windows only, such a rolled lead alloy plate can be rather easily obtained at a low cost. Besides, since the press punching is applied to the relatively thick rolled lead alloy plate to obtain the inner members forming grid windows thereby, a lead grid plate of less deformation can be obtained by one-step punching, which, being continuously carried out, greatly facilitates the manufacture of lead grid plates.

Furthermore, the thickness of the inner grid members is made to be less than that of the outer grid frame to make the active material holding surface recede either from one side surface or from both side surfaces of the outer frame of the grid plate, so that the active material retaining quantity per unit area of the lead grid plate can be made greater than that of a lead grid plate of even thickness. In addition to that, such increased ability for retaining an active material is further increased with an additional process carried out for roughing the surface. For this purpose, the inner grid forming members obtained by punching the grid windows are subjected to a modifying process which is carried out, for example, by a press or the like in the direction of their thickness thus reducing their thickness between 0.6 and 0.8 mm; and in addition to thinning the grid members, the sectional shape of the grid forming members is modifyed.

In the last place, the lead grid plate is obtained by punching the outer frame with thickness between 0.8 and 1.5 mm. Such lead grid plates can be continuously manufactured with high efficiency from a lead alloy strip which is produced by a continuous casting machine.

Since the outer frame of the lead grid plate is made thick measuring between 0.8 and 1.5 mm, the strength of the unit area of the lead grid plate is also sufficiently great to preclude the fear of deformation during the manufacture and handling for transportation as well as in service.

MODE B

A lead alloy plate cold rolled to a thickness of between 0.8 and 1.5 mm is subjected to a press punching with a metal mold to provide grid windows therein. Following this, a shape modifying process is applied to at least one of the vertical group and the transverse group of the inner grid members forming grid windows after punching. The modifying process is applied in the direction of thickness of these members to reduce their thickness to within the range from 0.6 to 0.8 mm. Then, the rolled lead alloy plate is hardened by heat treatment before punching the outer frame of the lead grid plate to obtain a lead grid plate for batteries. In this case, the rolled lead alloy plate has been softened through cold rolling. The softened plate facilitates the punching process so that the press punching by means of a metal mold can be accomplished with a small punching force for obtaining the grid windows. This, therefore, minimizes the deformation of the metal mold to ensure a longer service life and is advantageous in terms of maintenance.

The hardening heat treatment is carried out before punching the outer frame for the purpose of facilitating the above stated processes of punching the grid windows and the shape modification of the inner grid members and also for the purpose of imparting a sufficient strength to avoid the deformation that otherwise might take place when an active material is applied to the lead grid plate later on.

In Mode A described in the foregoing, when the rolled lead grid plate having a thickness of between 0.8 and 1.5 mm, and hardened by heat treatment is obtained by subjecting a continuous strip of a lead alloy produced by a continuous casting process to a hot rolling process to make its thickness between 0.8 and 1.5 mm, then the continuous mass prouction of desired lead grid plates can be accomplished at a low cost by continuously carrying out the rolling from the continuous strip, by punching the grid windows, by shape modifying process on the inner grid members and then by punching the outer frame.

In Mode B also, when the cold rolled plate of a lead alloy of thickness between 0.8 and 1.5 mm is to be obtained through a cold rolling process of a continuous strip of a lead alloy produced by a continuous casting process, the same advantage can be obtained as in Mode A.

It is the ninth object of this invention to provide a method for the continuous mass production at a low cost of lead grid plates for batteries, wherein an active material fills the grid windows of each lead grid plate, the outer frame of which measuring between 0.8 and 1.5 mm in thickness and at least one of the vertical and the transverse groups of the grid forming inner members is made thinner than the outer frame measuring between 0.6 and 0.8 mm; and wherein the continuous mass production comprises rolling a continuous strip; punching the grid windows; shape modification of the inner grid members; applying, filling and drying of the pastelike active material; and punching the outer grid frame.

In this case, the outer grid frame of thickness between 0.8 and 1.5 mm is punched after the grid windows are filled with the active material which is applied in a paste-like state. The paste of the active material is dried by an ordinary process after punching the outer frame. Such arrangement makes it possible to manufacture lead grid plates filled with an active material for batteries from the continuous strip of a lead alloy produced by a continuous casting machine.

The above stated rolled lead alloy plate which measures between 0.8 and 1.5 mm and which is hardened by heat treatment is obtained by subjecting the continuous strip of a lead alloy produced by a continuous casting process to a hot rolling process which is carried out to obtain a plate thickness of 0.8 to 1.5 mm. In accordance with this method, a continuous, low-cost mass production of the desired lead grid plate can be carried out including the rolling of the continuous strip, punching grid windows, shape modification of inner grid members, filling them with the active material, punching the outer frame and drying the active material.

The drying of the active material is carried out after punching the outer frame for the following reasons. The active material generally requires a long period of time for drying, the material also must be kept enclosed with cloth for a certain period for aging; and it is avantageous to carry out the drying process after separating the units of the lead grid plates which have been already filled with the active material one after another in terms of process control etc. For drying this type of active materials, an ordinary process can be employed. However, it is also possible to carry out such drying in accordance with a heating process essentially comprising heating by means of electromagnetic waves. The active material paste prepared through kneading by a kneading machine is applied to the lead grid plate for batteries either manually or by mechanical means to fill the voids in the grid with the paste material, which is then promptly transfered to a drying process. Such drying is generally accomplished by heating in an electric furnace at a temperature between 60° and 70°C for about 10 minutes. The electric furnace is a tunnel furnace in this case measuring about 10 meters in length. Or, such drying may be accomplished by an electromagnetic wave heating process for continuous drying. upon completion of such drying, each unit is enclosed with cloth and left for a period of about 3 days for aging. Following this, the unit is exposed to air for about 1 day before completion of the drying process.

It is the tenth object of this invention to provide a method whereby the manufacture of the filled plate can be accomplished at a greater speed for improved efficiency compared with the first method of manufacturing the filled plate of this invention. Such improved efficiency is attained by punching the outer frame after the drying of the active material is completed following the filling of the grid windows with the material so that these processes can be carried out in a continuous manner.

Although the heating may be accomplished by an ordinary method in practicing this method of the invention, the heating process principally comprising heating with electromagnetic wave is employed for faster drying of the filled plates for batteries and for more efficient production of such plates. Meanwhile, the conditions of such electromagnetic wave heating are controlled to ensure an adequately dried state to avoid excessive drying which causes cracks, etc. and eventual detachment of the active material in service. In cases of metal products, such drying by electromagnetic wave heating causes electric discharges. Since, in the present invention, the drying object comprises a kneaded mixture of lead oxide and sulfuric acid which is applied to a lead alloy grid, such electric discharge, might takes place when moisture content evaporates during the drying process.

In drying the paste of the active material applied to the grid windows first by a heating process principally comprising heating with electromagnetic waves, therefore, such electric discharges take place when the drying continues over an excessively long period of time. This drying process, therefore, should be stopped before arrival of such a critical state.

The active material is virtually dried through the above stated drying process and then is further subjected to another drying process which is carried out by an ordinary process. However, such additional drying can be completed within a very short period of time as compared with the conventional process. With the above-stated heating process carried out principally by means of electromagnetic waves, the active material is virtually dried almost instantaneously. By this, therefore, the problems caused by the conventional heat drying processes such as denaturation during the drying process is eliminated and, accordingly, such preliminary treatment as pickling or steam heating is dispensed with.

The length of time required for the drying of the filled plate by the electromagnetic wave heating is about 30 seconds which is sufficient for attaining the purpose although it somewhat varies with the composition of the active material, its moisture content and the distance between the electron tube and the filled plate.

In preparing the paste-like active materials to be used for negative plates, glycerine may be employed as a kneading liquid while some additives such as liqnin, reinforcement fiber, water glass, etc. may be added when necessary.

The other objects, features and advantages of this invention will become manifest from the following description and examples.

Furthermore, the heat treatment for hardening is accomplished by carrying out an aging treatment after an ordinary solution heat treatment. Although the treating conditions are unrestricted, preferred mode of such treatment is carried out by effecting quenching at a temperature between 180° and 230°C and by accomplishing the solution heat treatment with water at 0°C before aging at room temperature for 24 hours.

BRIEF DESCRIPTION OF DRAWINGS

In the drawings,

FIG. 12 illustrates a continuous casting process.

FIG. 14 is a plan view showing a lead grid plate obtained in accordance with this invention.

The following description illustrates preferred embodiments of this invention.

EXAMPLE 1

In the first process, and ingot of a lead alloy containing 3% Sb and 0.3% As and measuring 30 mm in thickness was rolled to 0.8 mm and 0.6 mm in thickness. By this, the hardness of the ingot which was 20 by Vickers hardness was decreased to 8.

In the second process, the rolled plate obtained as described above was subjected to press punching which was accomplished with a metal mold. The metal mold comprises in combination a male mold and a female mold. In this case, it was the female mold that required any attention.

Figure 1:
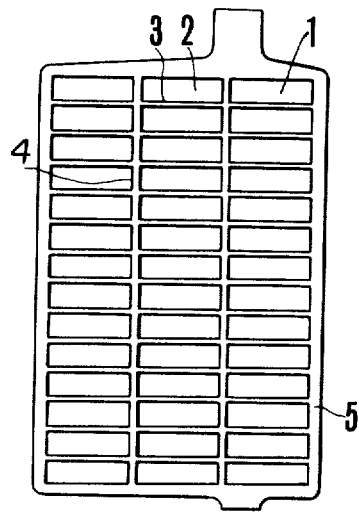
FIG. 1 illustrates the punching process of this invention.

As illustrated in FIG. 1, a zigzag arrangement of void parts 1 was punched in the first step and then another zigzag arrangement including the rest of the void parts 2 is punched in the second step. Another mode of multistep punching was carried out by punching odd rows of voids in the first step and then even rows in the second step. In addition to these modes of multistep punching, a singlestep punching process was also attempted. By each of these modes of punching, a lead grid plate was obtained with good results of punching. In the drawing, the reference numeral 3 represents transverse grid members; 4 vertical grid members; and 5 an outer frame.

The force required for the above stated punching was very small and the full load was about 300 kg. On the other hand, the punching force required for a base plate that had been hardened by heat treatment was 3000 kg at total load.

According to the results of tests for the service life, the metal mold did not show any change after the singlestep punching was repeated 50 thousand times.

After the second process, the lead grid plate thus punched was subjected to a solution heat treatment which was carried out at 230°C for 30 minutes and then was subject to natural aging for the purpose of improving its mechanical properties. By this, the hardness increased up to a value between 30 and 32 by Vickers hardness which was sufficient for use as a lead grid plate for batteries.

EXAMPLE 2

An ingot of a lead alloy containing 3% Sb and 0.3% As and measuring 30 mm in thickness was subjected to a cold rolling process at a reduction rate of 15% per pass up to 90% to obtain a thickness of 3 mm. The rolled plate was subjected to intermediate annealing at 200°C for 1 hour. Then the cold rolling was further carried out to make the thickness about 0.95 mm and the plate was again subjected to intermediate annealing at 200°C for 1 hour. After this, the final process was carried out by a cold rolling with reduction rate of 15% to make the thickness 0.8 mm. The hardened rolled plate of thickness 0.8 mm was subjected to the press punching process which was carried out as illustrated in the drawing to obtain a lead grid plate with its grid members measuring 0.8 mm in width.

The metal mold employed in the punching comprised a male mold which was provided with protrusions corresponding to the voids in the lead grid plate and a female mold in which only the parts corresponding to the grid members of the lead grid plate performed the function of the punching mold.

EXAMPLE 3

An ingot of a lead alloy which contained 3% Sb and 0.3% As and which was 30 mm thickness was rolled to a thickness of 0.8 and 0.6 mm. The hardness of the ingot was 20 by Vickers hardness. This hardness decreased to 8 through the rolling process.

Figure 3:
FIGS. 3 and 4 are sectional views across lines A-A' and B-B' indicated in FIG. 2, respectively.
Figure 2:
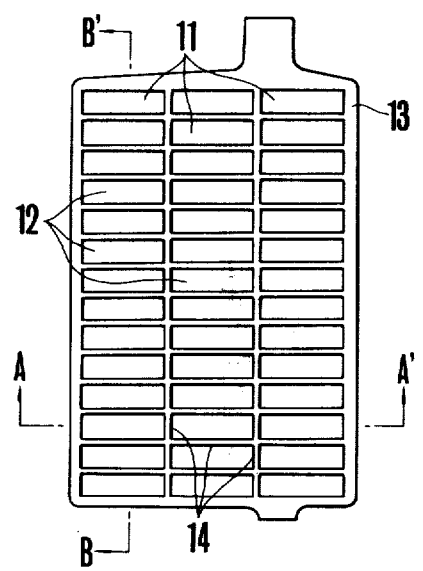
FIG. 2 illustrates the multistep press punching process of this invention.
Figure 4:
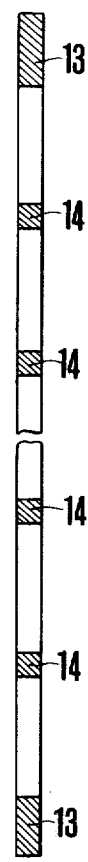

Using a punching metal mold comprising in combination a male mold and a female mold, the plate was subjected to a punching process which was carried out by punching a zigzag arrangement of voids 1 in the first step and then by punching another zigzag arrangement including the rest of voids 2 in the second step as illustrated in FIG. 2 through FIG. 4. The width of the parts of the female mold corresponding to the grid members of the lead grid plate was set in the range of from 0.5 to 1.0 mm which was the same width as that of the grid members of the product.

In addition to the above stated mode of punching, the punching process was also attempted in a different mode by punching voids in odd rows in the first step and then by punching voids in even rows in the second step. The results obtained by this mode of punching were the same as those of the above stated mode of punching.

The lead grid plate which was thus prepared with the grid members being of the same thickness as the plate thickness measuring between 0.5 and 1 mm was subjected to a solution heat treatment at 230°C for 30 minutes with a subsequent natural aging process to obtain a lead grid plate of Vickers hardness 30 to 32.

This lead grid plate permitted easy application of an acitve material thereto with no deformation caused by such work.

EXAMPLE 4

An ingot of a lead alloy (30 mm thick) containing 3% Sb and 0.3% As was rolled to the thicknesses of 0.8 mm and 0.6 mm.

By the rolling process, the hardness of the ingot which was 20 by Vickers hardness is softened to 8.

Then, using a punching metal mold comprising a combination of a male mold and a female mold, a punching process was carried out by punching voids in a zigzag arrangement in the first step and the rest of the voids were punched also in a zigzag manner in the second step as described in Example 3. The width of the parts of the female mold corresponding to the grid members of the lead grid plate was set between 0.5 and 1.0 mm in the same manner as the members of the grid product.

There was a slight degree of deformation resulting from the uniform press punching in each member of the lead grid plate which was obtained by the above-stated two-step zigzag press punching.

The lead grid plate in which the width of the grid members was equal to the thickness of the plate, both measuring between 0.5 and 1 mm was subjected to a solution heat treatment at 230°C for 30 minutes, followed by a natural aging treatment. By this, a lead grid plate of Vickers hardness between 30 and 32 was obtained.

The deformation of the grid members of the lead grid plate served to increase the adhering quantity of the active material and also to effectively prevent the active material from detaching.

EXAMPLE 5

An ingot of a lead alloy containing 3% Sb and 0.3% As and measuring 30 mm in thickness was rolled to thicknesses of 0.8 and 0.6 mm.

The hardness of the ingot which was 20 by Vickers hardness was softened to a value of 8 through this rolling process.

Following this, voids were punched using a punching metal mold comprising a combination of a male mold and a female mold in such a manner as described in Example 3. For this punching the width of the parts of the female mold corresponding to the width of the grid members of the product was set between 0.5 and 1.0 mm which was equal to the width of the grid members of the product.

After the above-stated press punching, the grid members were subjected to pressing which is carried out in an ordinary process for modifying the sectional shape of the grid members to a circular shape.

The lead grid plate was then subjected to a solution heat treatment at 230°C for 30 minutes followed by a natural aging to make its hardness between 30 and 32 by Vickers hardness.

With the grid members modified to a circular sectional shape, the lead grid plate thus obtained was capable of retaining an active material in quantity about 10% more than the quantity retainable by the grid members of a square sectional shape.

EXAMPLE 6

Figure 5:
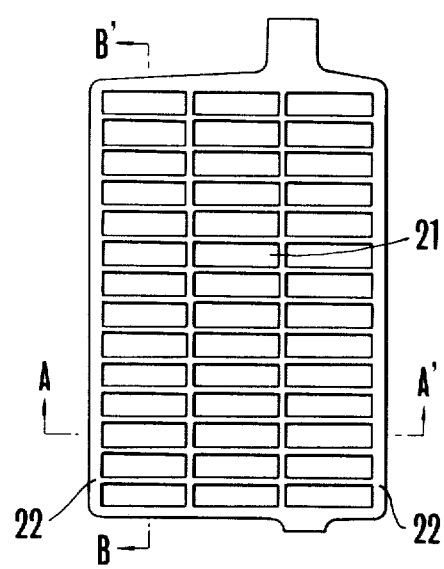
FIG. 5 illustrates an example of the lead grid plate of this invention prepared for use in batteries.

A rolled plate of a lead alloy containing 3% Sb and 0.3% As and measuring 1.5 mm in thickness was subjected to a single-step press punching process to punch voids 21 as shown in FIG. 5. By this, a base plate of a lead grid comprising 13 transverse members and 2 vertical members was obtained. In this stage, all of the outer frame 22, the inner transverse members 23 and the inner vertical members 24 measured 1.5 mm in thickness with the width of the outer frame 22 measuring 2.0 mm.

Figure 6:
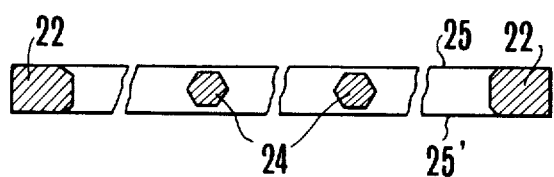
FIGS. 6, 8 and 10 are sectional views across the line A-A' indicated in FIG. 5.

Then, a shape modifying process was applied to the transverse members 23 and the vertical members 24 by means of a press. By this, the vertical member 24 was changed into a regular hexagonal shape, each side measuring 0.31 mm, as shown in FIG. 6. Thus, both the width and the thickness of each vertical member 24 were made to measure 0.78 mm and the face of each vertical member 24 was made to recede (1.5 − 0.78) ÷ 2 = 0.36 mm from the faces 25 and 25' of the outer frame 22.

Figure 7:
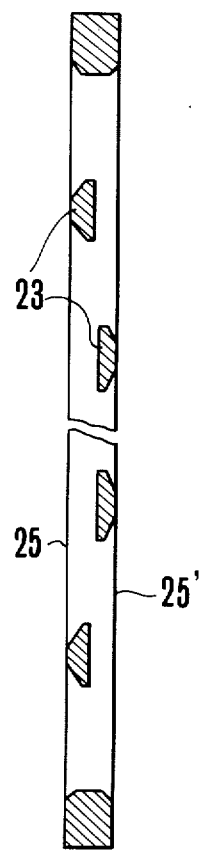
FIGS. 7, 9 and 11 are sectional views across the line B-B' indicated in FIG. 5.

On the other hand, the transverse members 23 were processed to change their sectional shape into a semi-trapezoid shape with both bottom sides chamfered as shown in FIG. 7. Referring to FIG. 7, the upper side of every other transverse member 23 was positioned on the same plane as the face 25 of the outer frame while the upper sides of the rest of the transverse member 23 was on the same plane as the other face 25' of the outer frame, the lower sides of all transverse members thus receding from the surface 25 or surface 25' of the outer frame.

The upper side of the above-stated trapezoid measures 0.7 mm, its chamfered bottom 2.3 mm and its height 0.7 mm. Therefore, the face of each transverse member receded from the surface 25 or 25' of the outer frame by 1.5 − 0.7 = 0.8 mm.

In this manner a lead grid plate in which all of the transverse and vertical members were receding from the faces of the outer frame was obtained for use in a battery applicable to motorcycles.

EXAMPLE 7

A lead grid plate for batteries was prepared in a similar manner as in Example 6. As shown in FIG. 7, the outer frame 22 measures 20 mm in width and 0.8 mm in thickness. Each vertical grid member 24 which was shaped into a flat hexagonal sectional shape measures 0.6 mm in thickness and 1.7 mm in width with its horizontal face measuring 0.5 mm in length. Each transverse member which was of semi-trapezoid sectional shape with both bottom sides chamfered measures 0.5 mm in width on the upper side, 1.34 mm in width on the bottom side and 0.6 mm in thickness.

Accordingly each of the vertical grid members 24 receded about 0.1 mm from the face 25 or 25' of the outer frame 22 while each of the transverse members 23 receded 0.2 mm from the face 25 or 25' of the outer frame.

EXAMPLE 8

Figure 8:
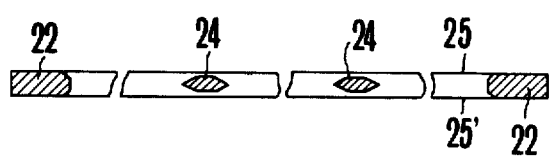
Figure 9:
Figure 10:
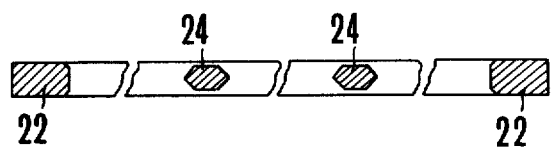
Figure 11:
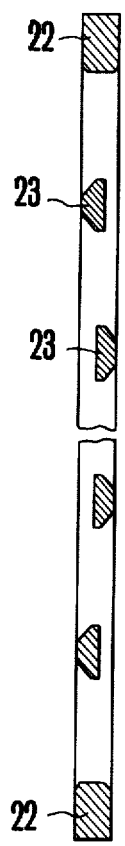

A lead grid plate for batteries applicable to motorcycles was prepared as shown in FIG. 7 and FIG. 8 in a similar manner as described in Example 6. The details of the product are as shown below:

| | | |
|---|---|---|
| Outer frame | Thickness: | 1.2 mm |
| | Width: | 2.0 mm |
| Vertical member | Shape: | Sidewise, flat hexagonal |
| | Thickness: | 0.8 mm |
| | Width: | 1.6 mm (of which horizontal face length is 0.8 mm) |
| Transverse member | Shape: | Semi-trapezoid with both bottom side chamfered |
| | Thickness: | 0.5 + 0.2 (chamfered part) = 0.7 mm |
| | Width: | 1.8 mm |

Vertical member receding distance from outer frame:
(1.2 − 0.8) ÷ 2 = 0.2 mm
Transverse member receding distance from outer frame:
1.2 − 0.7 = 0.5 mm

EXAMPLE 9

1. Rolling Process

In the case of cold rolling, rolling was carried out in the following sequence without intermediate annealing:

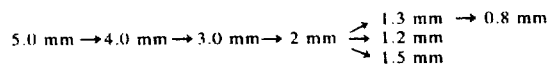

For hot rolling, rolling was carried out at a heating temperature between 190° and 210°C in a stepwise manner as shown below:

In the case of the hot rolling process, a hardening heat treatment was accomplished by carrying out a solution heat treatment process with or without water cooling immediately after the hot rolling.

2. Hardening Process by Heat Treatment

Since a hardening treatment was effected in the process of hot rolling as mentioned in the foregoing, a hardening treatment was carried out only when cold rolling was accomplished. By using a tunnel furnace, a cold rolled plate was heated at a temperature between 210° and 220°C for 30 minutes and was cooled with water to harden it.

3. Press Punching

Figure 13:
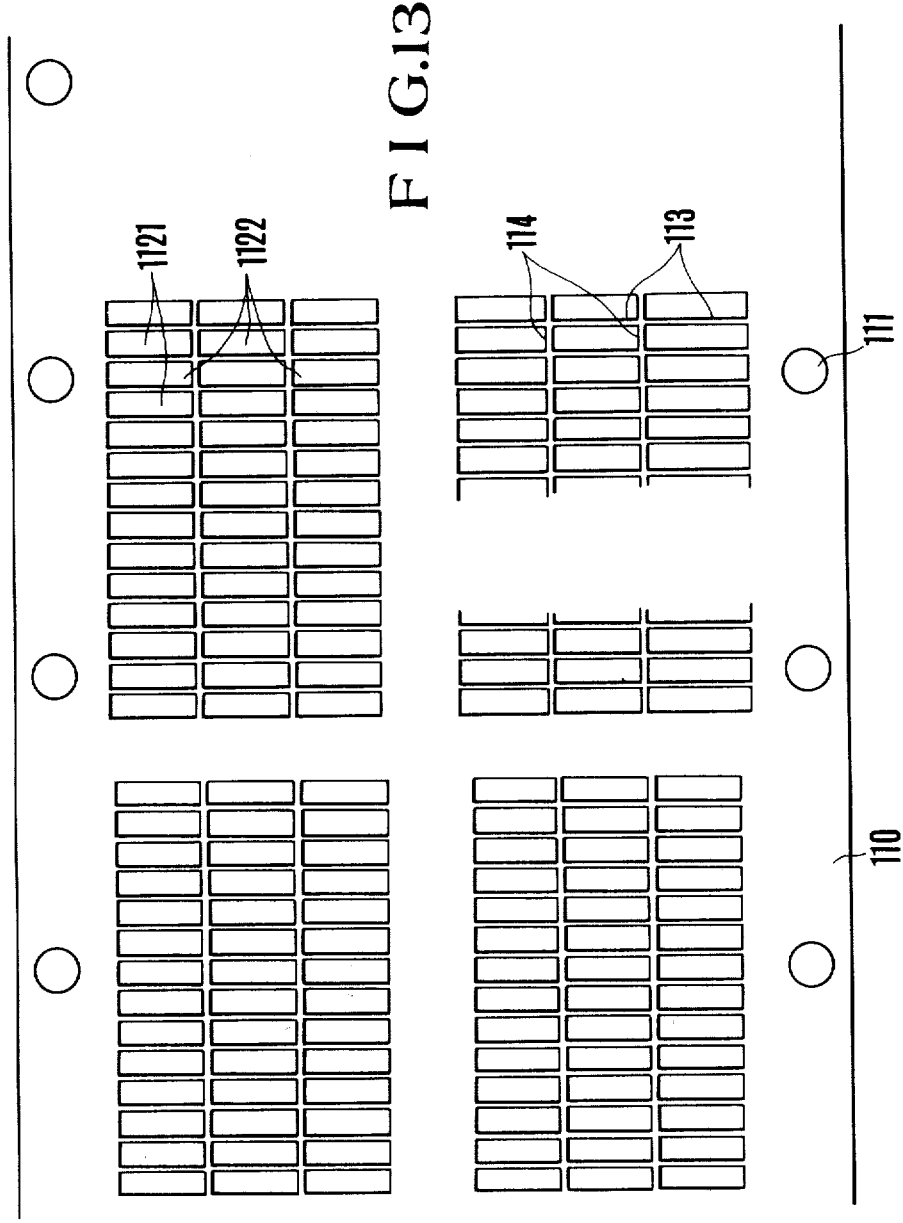
FIG. 13 illustrates the press punching process of this invention.

As shown in FIG. 13, holes 111 were first provided for the purpose of determining positions in both sides of a continuous strip of a rolled lead alloy plate 110 which had been hardened by heat treatment. After this, grid windows 12 were punched.

In a preferred mode of the punching process, one zigzag arrangement of grid windows 112-1 were punched in the first step of punching and then the other zigzag arrangement of grid windows 112-2. In this manner, plates of thickness 1.5 mm, 1.2 mm and 0.8 mm were punched. However, the width of the transverse and vertical grid members was set at 0.8 mm in all cases of these different plate thicknesses. The punching frequency of the press was set at 60 times/minute.

4. Shape Modification

Without any additional process, the press punched transverse and vertical members of the grid measures 0.8 mm in width and 1.5 mm, 1.2 mm or 0.8 mm in thickness. Therefore, in the case of the transverse members 13 as shown in FIG. 14, a shape modification was accomplished to make it into a sectional shape of an upside-down trapezoid measuring 2.3 mm, 1.8 mm or 1.34 mm in bottom length and 0.7 mm, 0.7 mm or 0.6 mm in height. As for the vertical grid members 14, modification was made, for instance, into a regular hexagon sectional shape. The active material retainability was increased by such shape modifying processes.

The shape modification was carried out by means of a press with a metal mold which consisted of upper and lower halves. The shape modifying process frequency was 60 times/minute.

Referring to FIG. 15 through FIG. 18, the details of this shape modifying process will be understood from the following description:

Shape Modification Example 1

Figure 15:
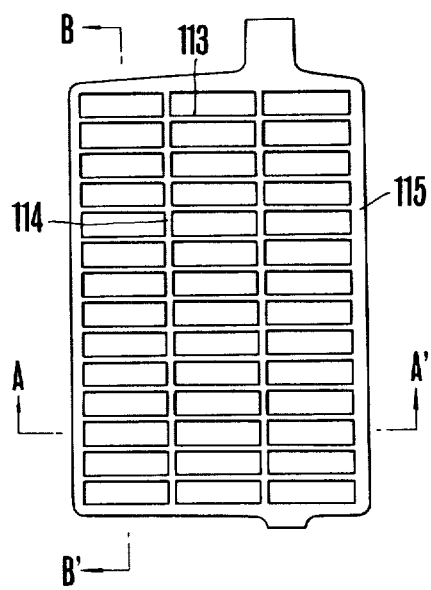
FIG. 15 is a plan view showing a lead grid plate which has been subjected to a shape modification process.
Figure 16A:
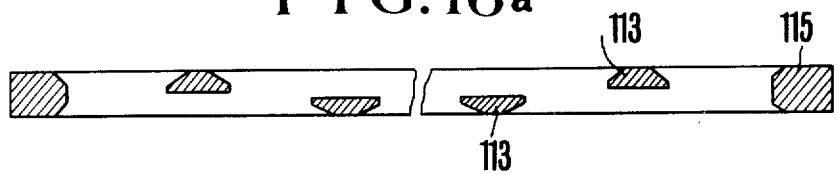
FIG. 16a and 16b, FIG. 17a and 17b and FIG. 18a and 18b are B-B' and A-A' sectional views of the lead grid plate shown in FIG. 15 respectively illustrating it by way of example.
Figure 16B:
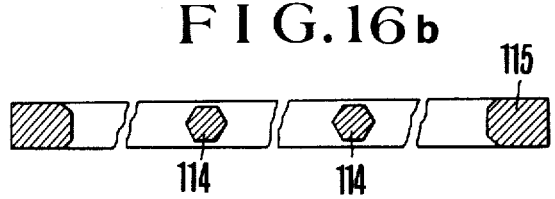

FIGS. 16a and 16b and FIG. 15 are B-B' and A-A' sectional views showing the sectional shapes of transverse and vertical grid members which have undergone the shape modifying process. The transverse members 113 are arranged in such a manner that every other member recedes from one side face of the outer frame 115 while each of other alternating members recede from the opposite side face of the outer frame 115. The sectional shape of the transverse members presents a trapezoid shape the upper side of which faces the outward direction and the lower side faces the inward direction, both edges of the lower side being chamfered. On the other hand, the vertical members 114 are arranged to recede from the both side faces of the outer frame 115 with their sectional shape presenting a semiregular hexagonal shape disposed sidewise.

Shape Modification Example 2

Figure 17A:
Figure 17B:
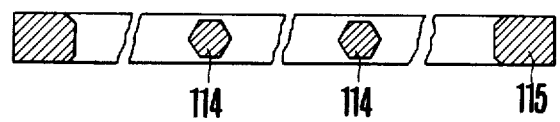

As shown in FIG. 17a and 17b, the transverse grid members 113 are disposed to recede from both side faces of the outer frame 115 with the transverse members being of a rectangular sectional shape. The vertical grid members 114 are arranged in the same manner as in the Shape Modification Example 1.

Shape Modification Example 3

Figure 18A:
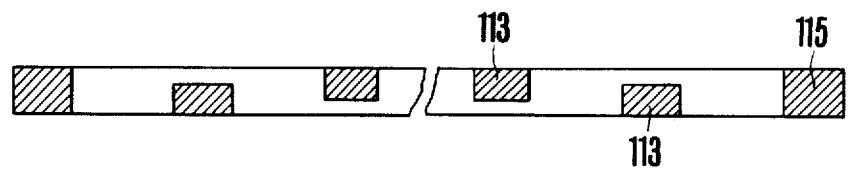
Figure 18B:
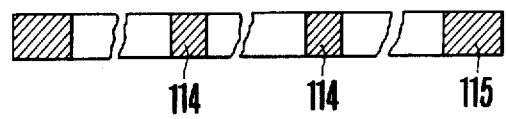

As shown in FIGS. 18a and 18b, every other transverse grid member 113 is disposed to recede from only one side face of the outer frame 115 while, alternately, the rest of the transverse members 113 are disposed to recede from only the opposite side face of the outer frame 115, the transverse members 113 being of a rectangular sectional shape. The shape of vertical members 114 is not modified in this example.

5. Outer Frame Punching Process

The rolled lead alloy plate 110 which had been processed with grid windows 112 punched and the inner grid members modified in shape was subjected to the outer frame punching process to obtain a lead grid plate product as illustrated in FIG. 14. The grid plate was usable as a plate for a battery applicable to motorcycles, the grid comprising 13 transverse members 113 and 2 vertical members 114.

EXAMPLE 10

1. Rolling Process

Without intermediate annealing, a rolling process was carried out in the following sequence:

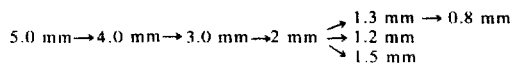

2. Press Punching Process

Carried out in the same manner as in Example 1.

3. Shape Modifying Process

Carried out in the same manner as in Example 1.

4. Hardening by Heat Treatment

The rolled lead alloy plate which was processed by punching grid windows and by shape modifying grid members was continuously passed through a funnel furnace for heating at 210° to 220°C for 30 minutes and then hardened by water cooling, then carried out for hardening.

5. Outer Frame Punching Process

Carried out in the same manner as in Example 1.

EXAMPLE 11

FIG. 12 illustrates a continuous casting device which comprises an internal cooling type casting wheel 101 measuring 1.5 meters in diameter and an endless steel strip 102 of 2 mm thickness which is in contact with the periphery of the casting wheel to move as the wheel 101 is driven by a motor. A casting mold is formed between a groove provided in the circumference of the wheel 101 and the steel strip 102, which is guided by guide rolls 103.

The molten lead alloy was poured into the casting mold through a molten metal casting port 104 disposed in the upper part of the device at a contact starting point between the casting wheel 101 and the strip 102, the molten alloy was cooled as the wheel 101 and the strip 102 rotate in the direction of arrow and a lead alloy strip 105 was continuously obtained from the lower part of the casting device. The composition and the casting conditions of the lead alloy are as shown in the following table.

|  | Example 1 | Example 2 | Example 3 |
|---|---|---|---|
| Sb, % | 2 | 3 | 4 |
| As, % | 0.2 | 0.3 | 0.4 |
| Pb, the remainder | | | |
| Casting temperature: 350 to 400°C | | | |
| Casting wheel rotating speed: 3 meters/min. to 7 meters/min. | | | |
| Dimensions of the mold part in the molding wheel: 5 mm in thickness and 140 mm in width | | | |

Lead grid plates were obtained from the strips thus obtained through processes carried out in accordance with Example 9 or 10 as desired.

EXAMPLE 12

The continuous casting process, rolling process, hardening by heat treatment, press punching process and shape modifying process were carried out in accordance with Example 11. Following these processes, the lead grid plate was filled with an active material by a process as shown below:

6. Active Material Filling Process (for positive plate)

The above-stated grid windows were filled with an active material by applying it to the lead grid plate by means of a pallet, the active material consisting of 40% by weight of PbO and 60% by weight of PbO with 1 liter of water and 1.4 liters of sulfuric acid (specific gravity: 1.3200) added to obtain total 10 kg of paste of the material.

7. Outer Frame Punching Process

An undried filled plate as shown in FIG. 3 was obtained by punching the outer frame of the lead grid plate from a rolled lead alloy plate 10 which had been processed by punching grid windows 12 and shape modifying inner grid members.

8. Drying Process

The above stated undried filled plate was continuously passed through a tunnel furnace measuring 10 meters in length for heating at 60° to 70°C for about 10 minutes. The heated plate was wrapped in cloth for aging for 3 days and then exposed to air for 1 day to obtain a dried filled plate. The filled plate thus obtained was usable as a plate for a battery applicable to motorcycles. The plate consisted of 13 transverse members 13 and 2 vertical members 14.

EXAMPLE 13

1. Continuous Casting Process

Carried out in the same manner as in Example 12.

2. Rolling Process

The rolling process was carried out in the following sequence without carrying out intermediate annealing:

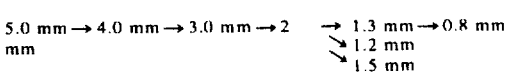

3. Press Punching Process

Carried out in the same manner as in Example 1.

4. Shape Modification:

Carried out in the same manner as in Example 1.

5. Hardening by Heat Treatment

A rolled lead alloy plate which had been processed by punching grid windows and by shape modifying grid members was continuously passed through a tunnel furnace for heating at a temperature of between 210° and 220°C for 30 minutes and then hardened by water cooling.

6. Active Material Filling Process

Carried out in the same manner as in Example 1.

7. Outer Frame Punching Process

Carried out in the same manner as in Example 1.

8. Drying Process

Carried out in the same manner as in Example 1.

EXAMPLE 14

The following process was carried out after completion of (1) continuous casting process through (6) active material filling process of Example 12.

7. Drying Process

Using an electronic oven (output 450 W), drying was carried out to a state before the state in which there would take place electric discharges. The distance between the electron tube and the lead grid plate was 250 mm. The results of the drying process are as shown below:

| Heating time | Drying degree |
|---|---|
| 10 seconds | Insufficient drying. Active material comes off |
| 15 seconds | Insufficient drying. Active material comes off |
| 20 seconds | Insufficient drying. Active material comes off |
| 30 seconds | Sufficiently dried. No cracks, no coming off of material. |
| 40 seconds | Excessively dried. Electric discharge takes place causing partial detachment of active material. |

By carrying out this example, it was found that the period of time for carrying out heating by means of electromagnetic waves should be from 20 ± 40 seconds and preferably about 30 seconds. It was thus confirmed that compared with the conventional heating process which requires heating for 10 minutes covering 10 meters of the plate, the drying time is shortened to a great degree.

Following the above, the filled plate dried by the ordinary electromagnetic wave heating process was wrapped in cloth for further drying for 3 days and then exposed to air for 1 day to complete drying. During this period, the PbO contained in the active material was somewhat modified by the sulfuric acid contained in the active material. As a result of this, the active material applied no longer got off.

8. Outer Frame Punching Process

Carried out in the same manner as in Example 1 to obtain a filled plate.

EXAMPLE 15

In accordance with Example 13, (1) continuous casting process through (5) hardening by heat treatment process were carried out. After this, the following processes were carried out.

6. Filling and Drying of Active Material (for negative plate)

The active material component consisting of 20% by weight of Pb and 80% by weight of PbO was blended with 0.6 liter of water and 1 liter of sulfuric acid (specific gravity: 1.320) to obtain 10 kg of a paste-like active material. After applying this material by means of a pallet, drying was carried out with an electronic oven (output 450 W) to obtain results as shown below.

| Heating time | Drying degree |
|---|---|
| 10 seconds | Insufficiently dried. Active material comes off. |
| 20 seconds | Sufficiently dried |
| 25 seconds | Sufficiently dried |
| 30 seconds | Sufficiently dried |
| 40 seconds | Excessively dried. Electric discharge takes place causing partial detachment of active material. |

The above table indicates that, in accordance with this example, the time for heating should be from 10 to 40 seconds and preferably from 20 to 30 seconds.

The subsequent process for drying is carried out by an ordinary process in the same manner as in Example 14 to obtain a dried product.

7. Outer Frame Punching Process

Carried out in the same manner as in Example 3 to complete a filled plate.

What is claimed is:

1. A method for manufacturing a lead grid plate having an outer frame portion for batteries comprising the first step of preparing a rolled lead alloy plate measuring 0.5 to 1 mm in thickness; and the second step of press punching the rolled lead alloy plate by means of a metal mold to obtain a lead grid plate, the width of the grid forming members of the plate measuring about the same as the thickness of the plate, said second step being accomplished in at least two steps by press punching only voids at least in every alternate file or row or in a zig-zag line, then filling the lead grid plate with active material.

2. A method for manufacturing a lead grid plate having an outer frame portion for batteries according to claim 1, which further comprises the step of hardening the lead grid plate by a heat treatment.

* * * * *